(12) United States Patent
Edwards

(10) Patent No.: US 11,174,032 B2
(45) Date of Patent: Nov. 16, 2021

(54) APPARATUS AND METHOD FOR HEATING AN AIRCRAFT STRUCTURE

(71) Applicant: AIRBUS OPERATIONS LIMITED, Bristol (GB)

(72) Inventor: Henry Edwards, Bristol (GB)

(73) Assignee: Airbus Operations Limited, Bristol (GB)

( * ) Notice: Subject to any disclaimer, the term of this patent is extended or adjusted under 35 U.S.C. 154(b) by 273 days.

(21) Appl. No.: 16/274,786

(22) Filed: Feb. 13, 2019

(65) Prior Publication Data
US 2019/0263529 A1    Aug. 29, 2019

(30) Foreign Application Priority Data
Feb. 28, 2018    (GB) ...................................... 1803305

(51) Int. Cl.
*B64D 15/04*     (2006.01)
*B64C 21/02*     (2006.01)
*B64C 21/06*     (2006.01)

(52) U.S. Cl.
CPC ............ *B64D 15/04* (2013.01); *B64C 21/025* (2013.01); *B64C 21/06* (2013.01); *B64C 2230/04* (2013.01); *B64C 2230/22* (2013.01)

(58) Field of Classification Search
CPC ............ B64D 15/04; B64D 2013/0607; B64D 2033/0233; B64C 21/06; B64C 21/025; B64C 2230/22
See application file for complete search history.

(56) References Cited

U.S. PATENT DOCUMENTS

| | | | |
|---|---|---|---|
| 3,917,193 A | 11/1975 | Runnels, Jr. | |
| 4,099,691 A | 7/1978 | Swanson et al. | |
| 4,752,049 A | 6/1988 | Cole | |
| 4,976,397 A | 12/1990 | Rudolph et al. | |
| 5,114,100 A | 5/1992 | Rudolph et al. | |
| 5,348,256 A * | 9/1994 | Parikh ................... | B64D 15/04 244/208 |
| 5,899,416 A | 5/1999 | Meister et al. | |

(Continued)

FOREIGN PATENT DOCUMENTS

| | | |
|---|---|---|
| EP | 0 436 243 | 7/1991 |
| EP | 3 127 813 | 2/2017 |

(Continued)

OTHER PUBLICATIONS

Search Report for GB 1803305.0, dated Aug. 7, 2018, 5 pages.

(Continued)

*Primary Examiner* — Richard R. Green
*Assistant Examiner* — Madison Elizabeth Dittner
(74) *Attorney, Agent, or Firm* — Nixon & Vanderhye P.C.

(57) ABSTRACT

An aircraft structure, for example a wing, including a skin. The skin has an external surface, on an outer face of the skin. The skin has an internal surface, located opposite the external surface on an inner face of the skin. The aircraft structure includes a laminar flow control system including a compressor. The aircraft structure is so arranged that the exhaust air from the compressor is directed onto the internal surface of the skin of the aircraft structure, for example thus providing hot exhaust air which function as an ice protection system (whether by de-icing or anti-icing). A method of providing ice protection on a surface of an aircraft using exhaust air from a laminar flow control compressor is also described.

16 Claims, 8 Drawing Sheets

(56) References Cited

U.S. PATENT DOCUMENTS

| | | | |
|---|---|---|---|
| 5,944,287 | A | 8/1999 | Rodgers |
| 7,152,829 | B2 | 12/2006 | Bertolotti |
| 8,128,037 | B2 | 3/2012 | Powell et al. |
| 9,156,556 | B2 | 10/2015 | Chene |
| 9,279,541 | B2 * | 3/2016 | Cohen ............... F17C 7/00 |
| 10,100,744 | B2 * | 10/2018 | Mackin ............... F02C 7/27 |
| 10,618,636 | B2 * | 4/2020 | Mehring ............ B64D 13/08 |
| 2017/0099702 | A1 | 4/2017 | Carracedo et al. |
| 2017/0210476 | A1 | 7/2017 | Morishita et al. |
| 2017/0217569 | A1 | 8/2017 | Gueuning et al. |

FOREIGN PATENT DOCUMENTS

| | | |
|---|---|---|
| GB | 2234351 A | 10/1998 |
| WO | 2005/113336 | 12/2005 |
| WO | 2017/005737 | 1/2017 |

OTHER PUBLICATIONS

Braslow "A History of Suction-Type Laminar Flow Control with Emphasis on Flight Research", NASA History Division, Monographs in Aerospace History, No. 13 (1999).

Hight Reynolds Number Hybrid Laminar Flow Control (HLFC) Flight Experiment: IV Suction System Design and Manufacture, NASA/CR-1999-209326 (Apr. 1999).

Wagner et al., "Laminar Flow Control Leading Edge Systems in Simulated Airline Service," 16th Congress of the International Council of the Aeronautical Sciences (Aug. 1988).

Hybrid Laminar Flow Control (TSI), AFLoNext, $2^{nd}$ Gen., Active Wing (Jan. 2016).

European Search Report cited in EP 19157875.6 dated Jul. 2, 2019, 9 pages.

* cited by examiner

APPARATUS AND METHOD FOR HEATING AN AIRCRAFT STRUCTURE

RELATED APPLICATION

This application claims priority to United Kingdom Patent Application GB 1803305.0 filed Feb. 28, 2018, the entirety of which is incorporated by reference.

BACKGROUND OF THE INVENTION

The present invention concerns an apparatus and method for heating an aircraft structure, for example forming part of a system for aircraft ice protection. More particularly, but not exclusively, this invention concerns providing ice protection for an aircraft structure which utilises a laminar flow control (LFC) system.

The leading surfaces of aircraft in flight are susceptible to ice build-up when the incident airflow contains droplets of supercooled liquid water. Ice build-up alters the aerodynamic characteristics of the aircraft, causing impaired aerodynamic performance. Therefore, to de-ice and to prevent ice formation, ice protection systems are commonly used in aircraft leading surfaces. FIG. 1 shows an exemplary ice protection system in an aircraft wing. A duct 101 carries hot bleed air from the engine along the length of a section of a wing 100. The duct is perforated along its leading side 103 to form a "piccolo" tube, directing hot engine bleed air onto the interior of the leading edge of the skin 105. The hot engine bleed air heats the aircraft skin on the leading edge to thaw any ice present and to prevent further ice build-up. The spent bleed air is exhausted from the wing to the outside airflow.

U.S. Pat. No. 9,156,556 concerns an ice protection system which utilizes hot air bled from an engine on the aircraft. Certain systems of the prior art are designed to enable the leading edge of the wing to be kept hot enough that ice never forms, so that ice-protection is provided primarily by an anti-icing system. Other means of providing ice-protection have been proposed. For example, US2017/099702 discloses an ice protection device for an aircraft surface, the device comprising a layer of electrically conductive material adapted to be heated by electromagnetic induction.

Laminar Flow Control (LFC) systems are used to delay the transition of a boundary layer of airflow over a skin of an aircraft from laminar to turbulent flow. By applying suction through the aircraft skin it is possible to stabilise the laminar boundary layer and so delay its transition to turbulent flow. Delaying the transition of the boundary layer to turbulent flow reduces the length of skin of the aircraft in contact with the turbulent boundary layer, yielding a reduction in drag and an associated increase in fuel efficiency and aircraft range. FIG. 2 shows an exemplary LFC system in an aircraft wing 200. A compressor 207 is used to generate suction, pulling air through a perforated section 209 of the aircraft skin 205. The air passes through the compressor and is exhausted from the aircraft structure to the outside airflow. U.S. Pat. No. 7,152,829 relates to an LFC system that provides boundary layer control by suction through a perforated surface of an airfoil.

It is known in the prior art to use ice protection and laminar flow control systems together in an aircraft structure. FIG. 3 shows exemplary ice protection and laminar flow control systems implemented together in an aircraft wing 300. An aircraft skin 305 comprises perforated 309 and non-perforated sections 311. A plurality of chambers 313 are arranged adjacent to the skin of the wing, such that at least one such chamber is formed under the perforated section 309 of the skin and another of the chambers is formed under the non-perforated section 311 of the skin. A duct 301 carries hot bleed air from the engine along the length of a section of the wing. The hot engine bleed air is piped into the chamber under the non-perforated section 311 of the skin, where it heats the adjacent aircraft skin. The spent engine bleed air is then exhausted from the wing to outside airflow. A compressor 307 is used to generate suction and is connected to the chamber under the perforated section 309 of the skin, such that the compressor sucks in air through the perforated section of the aircraft skin. The air passes through the compressor 307 and is exhausted from the aircraft structure to the outside airflow. Thus, the ice protection system and LFC system are functionally and structurally independent of one another.

U.S. Pat. No. 5,944,287 discloses a gas turbine engine enclosed in a nacelle, the nacelle having a porous structure which is provided with a laminar flow control system having its own suction pump. An ice protection system is also provided at the leading edge of the nacelle, which utilizes hot air from the gas turbine compressor.

Ice protection and LFC systems each provide an aircraft with improved aerodynamic performance, and therefore increased aircraft range and fuel efficiency, either by actively managing the airflow around the aircraft or by preventing build-ups of ice which would otherwise distort and degrade the aircraft aerodynamics.

However, the inclusion of these systems also adds significant weight to the aircraft, with an accompanying decrease in aircraft range and fuel efficiency. Running an electrically powered compressor also gives rise to a fuel burn penalty due to the increased load on the aircraft electrical system. The viability of ice protection and LFC systems is, in significant part, determined by the weight added to the aircraft by their inclusion. Incorporating ice protection and LFC systems into any part of an aircraft also adds significant extra complexity to, and consumes valuable space within, the aircraft.

The present invention seeks to mitigate at least one of the above-mentioned problems. Alternatively or additionally, the present invention seeks to provide an improved ice protection system for an aircraft. Alternatively or additionally, the present invention seeks to provide an improved ice protection system for an aircraft that employs an LFC system.

SUMMARY OF THE INVENTION

The present invention provides, according to a first aspect, an aircraft structure comprising a skin. The skin has an external surface, on an outer face of the skin. The skin has an internal surface, located opposite the external surface on an inner face of the skin. The aircraft structure includes a laminar flow control (LFC) system comprising a compressor. The aircraft structure is so arranged that (for example as a result of appropriate ducting from the compressor) the exhaust air from the compressor is directed onto the internal surface of the skin of the aircraft structure. Thus during use of an embodiment of the present invention, hot exhaust air from the compressor is used to provide an ice protection system (whether by de-icing or anti-icing). In embodiments of the invention, the primary ice protection system provided for the external surface of the aircraft structure during flight includes use of the exhaust air from the compressor. Such an ice protection system removes the need for complex apparatus to divert engine bleed to the region of the airframe to be heated. This may enable a reduction in weight, complexity, and/or space consumed. Removing or reducing the need for engine bleed air also reduces the associated penalty on engine performance.

It may be that the external surface is in a region of the aircraft structure which faces the airflow when in flight. It may be that the aircraft structure includes an aerofoil surface. It may be that the aircraft structure is a tail plane or part thereof. It may be that the aircraft structure is a wing, or part thereof.

Leading surfaces of aircraft (those which face the airflow when in flight) are particularly susceptible to icing, due to increased incidence of supercooled liquid water. Therefore these leading surfaces are the surfaces which most require ice protection systems. Aircraft wings are one of the parts of an aircraft most often fitted with LFC systems, and therefore able to benefit from embodiments of the present invention.

It may be that the aircraft structure further comprises a plurality of chambers. The chambers may be arranged adjacent to the skin of the aircraft structure, for example each being formed in part by a part of the skin. At least one chamber may be connected to an intake of the LFC compressor. At least one chamber may be connected to an exhaust of the LFC compressor. In an embodiment of the invention, the use of a chambered construction on the interior of the skin may be used to direct the compressor exhaust air onto the internal surface of the skin. It will be appreciated that in certain embodiments, each chamber may be defined in part by the skin of the aircraft structure, for example such that the interior of the chamber is bounded on one side by the inner face of the skin and on the opposite side by a wall that is inwardly spaced apart from the inner face of the skin.

One or more ducts may be provided which assist in directing exhaust air from the compressor onto the internal surface of the skin of the aircraft structure.

It may be that once directed onto the internal surface, the compressor exhaust gas is directed into an internal cavity of the aircraft structure. In an embodiment of the invention, directing the compressor exhaust gas into an internal cavity of an aircraft structure, once it has been used to heat the internal surface of the aircraft skin, provides a secondary heating effect on other parts of the aircraft structure. For example, the compressor exhaust air, despite having been cooled in the process of heating the aircraft skin, is still above ambient temperature and may provide an anti-icing/de-icing effect to other parts of the aircraft structure.

It may be that the aircraft structure further comprises one or more vents from the aircraft structure, for compressor exhaust air. The one or more vents may be connected, for example via one or more ducts, with the exhaust of the compressor. The one or more vents may be arranged to receive exhaust air after it has been directed onto the internal surface of the aircraft structure. The vents may comprise nozzles that direct air, for example being arranged to blow air that in use assists with laminar flow attachment over an aerofoil surface. In an embodiment of the invention, the use of nozzles to vent compressor exhaust air may provide an advantageous effect on aircraft aerodynamics. For example, blowing air over the flaps on the trailing edge of the wing may increase lift at high angles of attack.

There may be a control system associated with the compressor. The control system may comprise a control unit. The control system may be arranged to control other parts or components of the aircraft. The control system may be configured to provide control over the level of ice-protection, whether by de-icing or prevention of ice formation, provided. An additional heater may be provided for the purposes of ice protection. Such an additional heater may be controlled by the control system. The additional heater may be arranged to directly heat the exhaust air from the compressor. The additional heater may be arranged to heat the internal surface of the skin of the aircraft structure by means other than heating the exhaust air from the compressor; for example the additional heater may be arranged to directly heat the internal surface of the skin. The control system may be arranged to control characteristics of the exhaust air from the compressor, for example to provide control over the level of ice protection. For example, the control system may be arranged to control the temperature and/or flow rate of the exhaust air, for example without detrimentally affecting the function of the LFC system. The control system may—for the purposes of increasing the level of ice protection (i.e. provide more heat) at a given time—for example run the LFC system harder than required for the LFC system to function. The control system may be arranged to vary the pressure ratio of the compressor to provide control over the temperature of the exhaust gas. The control system may be configured to operate the compressor in a first mode, where ice-protection is not actively provided (e.g. such that the sole intended function of the compressor is to provide LFC) and is additionally configured to operate in a second mode, where ice-protection is actively provided (e.g. such that extra heat is delivered to the skin of the aircraft structure requiring ice protection, whether by means of running the compressor differently and/or adding heat in other ways). The switching between the first mode and the second mode may be activated manually, for example by a pilot of the aircraft, or may be switched automatically.

It may be that the compressor is arranged such that its efficiency may be varied to control its exhaust gas temperature. In an embodiment of the invention, running the compressor in a less efficient mode, thus resulting in increased exhaust air temperature than would result if the compressor were run normally to provide its LFC function alone, allows the ice protection system to provide a greater heating effect than would otherwise be provided inherently. The compressor may be in the form of a variable geometry compressor, for example having a variable vane geometry. In the case where a control system for controlling the compressor is provided, it may be that the control system is arranged to vary the pressure ratio of the variable geometry compressor to provide control over the temperature of the exhaust gas.

The LFC compressor may be located in the aircraft structure. The LFC compressor may be electrically powered. The LFC compressor is typically provided as a compressor unit that is provided in addition to and/or separately from the engines of the aircraft that provide the primary means of propulsion for the aircraft.

It may be that the LFC system comprises multiple compressors, each contributing heated air that is used to provide an ice protection function. Such an arrangement may enable more heat to be generated that if fewer compressors are provided.

The aircraft structure may form part of an aircraft. The aircraft may be a commercial passenger aircraft, for example an aircraft capable of carrying more than fifty passengers, for example more than one hundred passengers. The aircraft may be a commercial passenger aircraft, for example an aircraft capable of carrying more than fifty passengers, for example more than one hundred passengers. The aircraft may be a military aircraft. The aircraft may have a length greater than 25 m.

According to a second aspect of the invention, there is provided a method of providing ice protection (e.g. anti-icing) on a surface of an aircraft using exhaust air from a laminar flow control (LFC) compressor. The method may utilise the apparatus of the first aspect of the invention.

It may be that the method comprises a step of switching from running the LFC compressor solely for the purpose of laminar flow control to operating in a manner that delivers extra heat to the surface of the aircraft that requires ice protection, whether by means of running the LFC compressor differently (e.g. at a different pressure ratio) and/or by generating extra heat in other ways.

It may be that the method comprises the step of controlling the pressure ratio induced by the compressor to control the temperature of the exhaust air.

It may be that the method comprises the step of circulating the compressor exhaust gas into an internal cavity of the aircraft structure.

It may be that the method further comprises the step of venting the compressor exhaust air from the aircraft structure, for example to the region outside of the aircraft structure. There may be a vent provided for this purpose. The compressor exhaust air may be vented from the aircraft structure in such a way as to improve aerodynamic performance. For example, the exhaust air may be blown onto an external surface of the aircraft in a manner which aids aerodynamic performance.

According to a third aspect of the invention, there is provided an ice protection system for use on an aircraft, for example an aircraft wing. The ice protection system comprises a pump for sucking air through perforated cladding forming part of the exterior of the aircraft. The aircraft may also comprise a non-perforated cladding. The ice protection system is preferably so arranged that, in use, exhaust gas from the pump heats a portion of the aircraft that is susceptive to ice formation. For example, the pump may be arranged to guide exhaust gas from the pump to heat a portion of the aircraft, for example the non-perforated cladding. The exhaust gas may be hotter than the portion of the aircraft being heated without the need for any additional electric heating means. The exhaust gas may alternatively be heated by an additional heater element before being guided to the portion of the aircraft being heated. Embodiments of such an ice protection system may remove the need for complex apparatus to divert engine bleed air to the region of the airframe to be heated. This provides a reduction in weight, complexity, and space consumed. Removing or reducing the need for engine bleed air also reduces the associated penalty on engine performance. The pump of the fourth embodiment may be provided separately from the rest of the aircraft, for example being fitted as part of a method of assembly. Ducting may also be provided to enable the exhaust air to be guided to the portion of the aircraft to be heated. A control unit may be provided for providing control over the ice protection provided by the exhaust air from the pump.

According to a fourth aspect of the invention, there is provided a kit of parts for forming an ice protection apparatus for an aircraft aerofoil surface. The kit comprises a compressor or a pump and ducting for conveying air to and from the compressor or pump, and a control unit for providing control over the ice protection provided by exhaust air from the compressor or pump. It may be that the compressor/pump has a power rating of more than 10 kW. The compressor/pump may have a maximum safe operating power rating of more than 50 kW. For example the compressor/pump may be capable of consuming more than 50 kW (possibly at least 75 kW) of power over a continuous period of more than 1 hour. The compressor or pump may be so arranged as to be capable of generating heat at a rate of greater than 2 kW, preferably greater than 5 kW, and optionally greater than 10 kW (or possibly more than 20 kW). It may be that the compressor/pump has a maximum power output of less than 300 kW, and possibly less than 200 kW. The rate of airflow provided from the exhaust of the compressor/pump may be greater than 100 g/sec, preferably higher than 250 g/sec and possibly 1 Kg/sec or higher. The mass flow rate of air provided from by the compressor/pump may be less than 100 Kg/sec and possibly less than 20 Kg/sec. If there are multiple compressors/pumps moving air for both laminar flow control and ice protection, it may be that the above figures represent the amounts for all such compressors/pumps serving the same surface and/or aircraft structure.

It will of course be appreciated that features described in relation to one aspect of the present invention may be incorporated into other aspects of the present invention. For example, the method of the invention may incorporate any of the features described with reference to the apparatus of the invention and vice versa.

The term 'or' shall be interpreted as 'and/or' unless the context requires otherwise.

DESCRIPTION OF THE DRAWINGS

Embodiments of the present invention will now be described by way of example only with reference to the accompanying schematic drawings of which.

DETAILED DESCRIPTION

Figure 1:
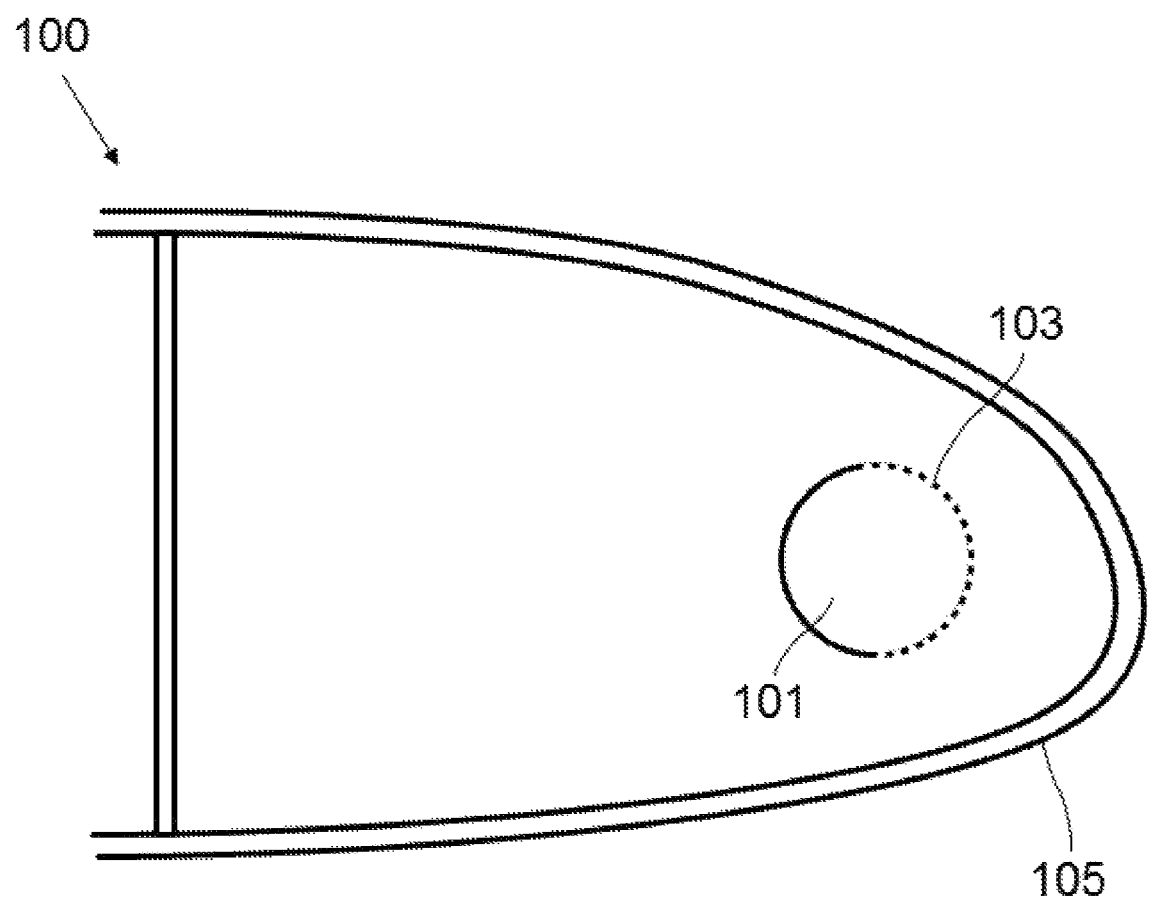
FIG. 1 shows a section view of an example wing featuring an ice protection system of the prior art.
Figure 2:
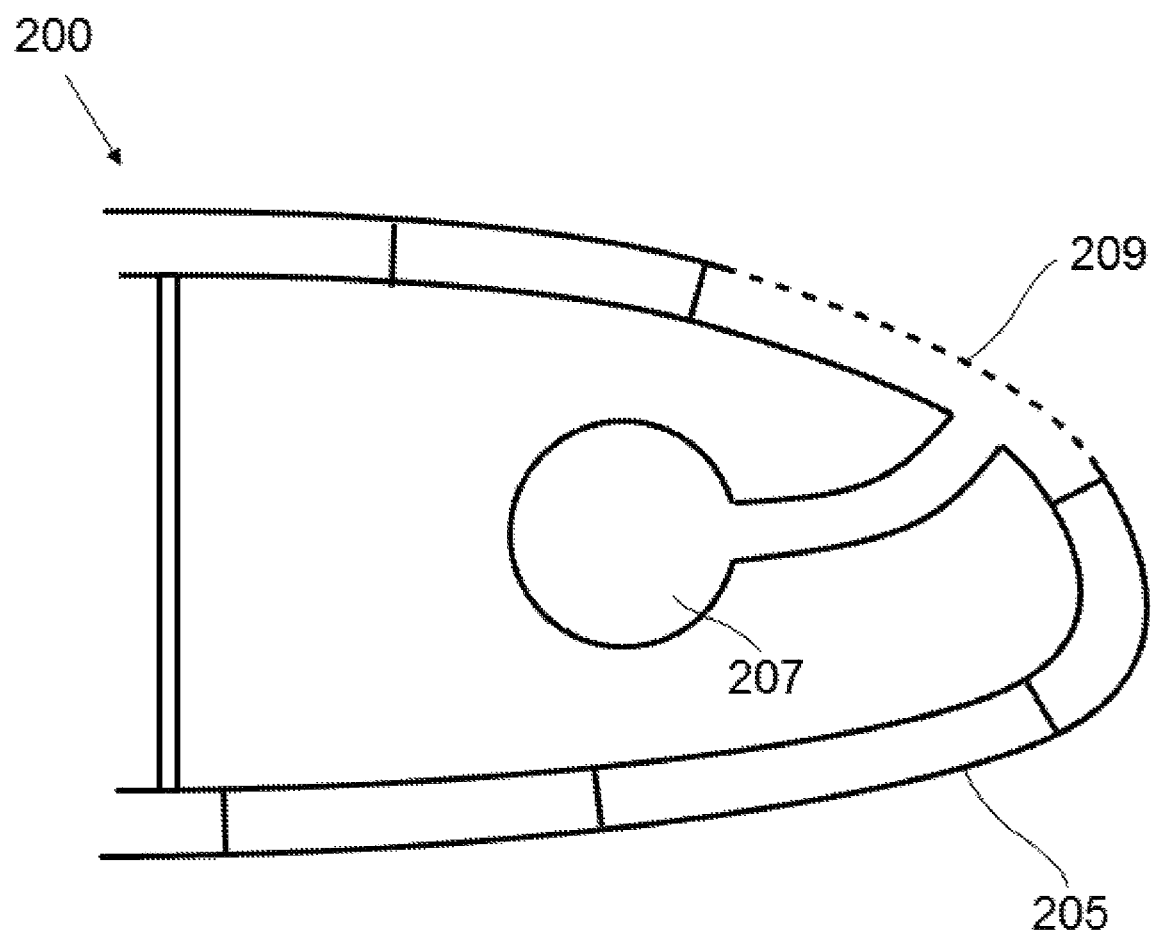
FIG. 2 shows a section view of an example wing featuring a laminar flow control system of the prior art.
Figure 3:
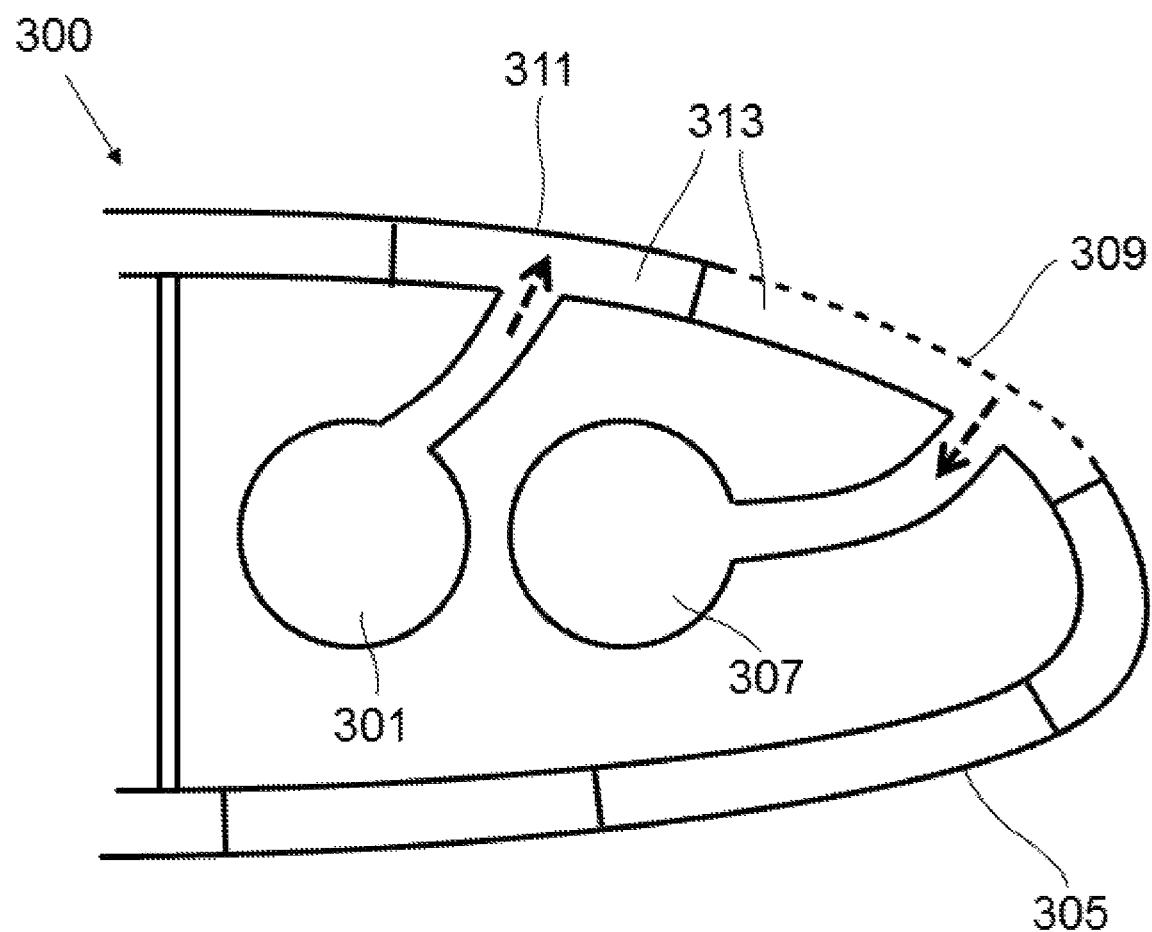
FIG. 3 shows a section view of an example wing featuring both an ice protection system and a laminar flow control system of the prior art.
Figure 4:
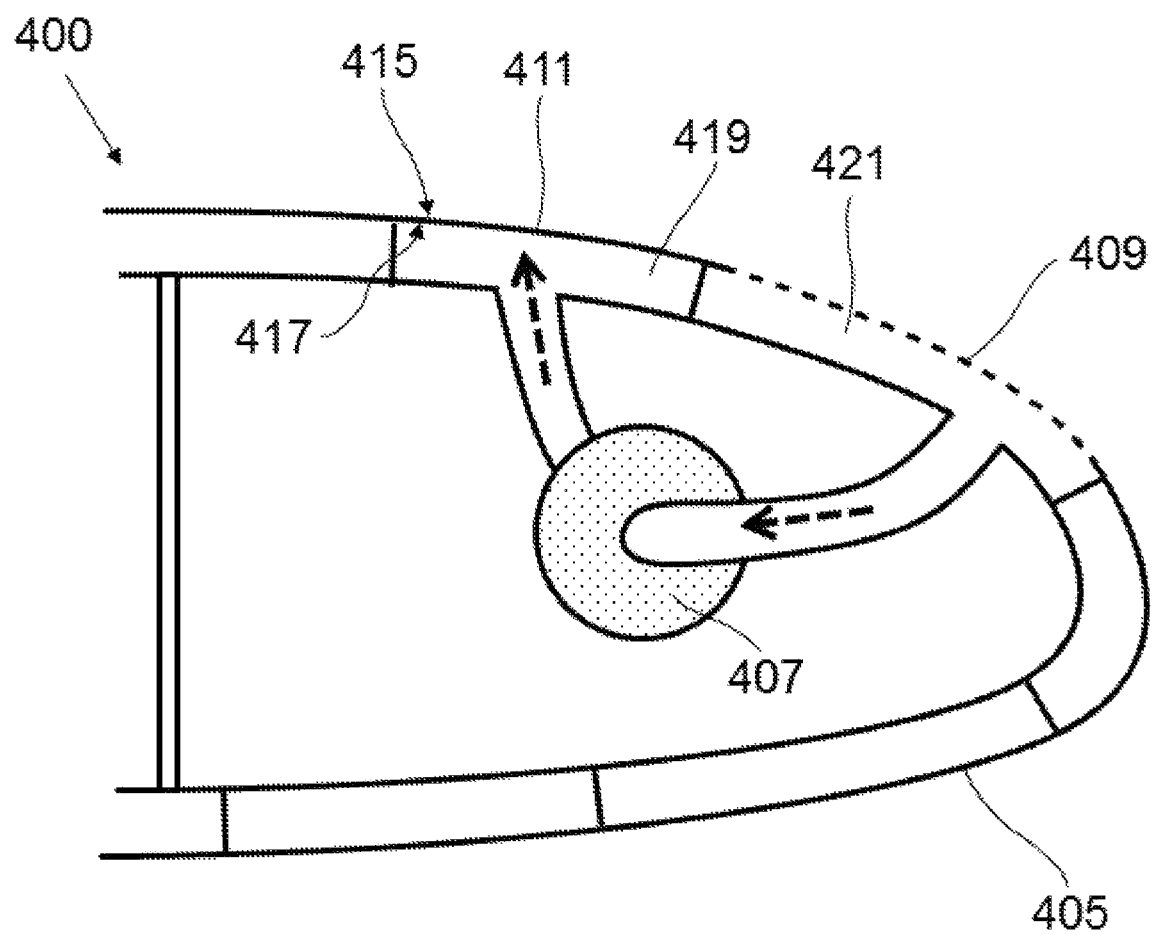
FIG. 4 shows a section view of a wing with a compressor heated leading edge according to a first embodiment of the invention.

FIG. 4 shows an aircraft structure according to a first embodiment of the invention. The aircraft structure in this exemplary embodiment is an aircraft wing. The aircraft structure 400 comprises a skin 405 with perforated 409 and non-perforated sections 411. The non-perforated section of the skin comprises an external surface 415 on its outer face, and an internal surface 417 on its inner face, opposite the external surface. When in flight, the external surface is exposed to outside airflow and so is susceptible to ice formation. The aircraft structure further comprises a plurality of chambers 419, 421 arranged adjacent to the skin, such that a first chamber 419 is formed on the internal surface of the non-perforated section of the skin, and a second chamber 421 is formed inside the aircraft structure on the perforated section of the skin. The perforated section of the skin, the second chamber, and a compressor 407 comprise a laminar flow control (LFC) system. The compressor intake is connected to the second chamber, and the compressor exhaust is connected to the first chamber. The first chamber is further connected to a vent (not shown) from the aircraft structure.

In operation, the compressor sucks air through the perforated section of the aircraft skin and through into the compressor. The compressor performs work on the air, which raises the temperature of the air. It may for example be the case that the pressure ratio is such that the temperature is raised by more than 50 degrees C. The intake air may be at a temperature of below −40 degrees C. The exhaust air may have a temperature greater than 10 degrees C. The pressure ratio of the compressor may be greater than 2:1 (but is likely to be less than 10:1). The hot compressor exhaust air is then directed into the first chamber, where it heats the internal surface of the aircraft skin, before being exhausted from the aircraft structure through the vent.

Figure 5:
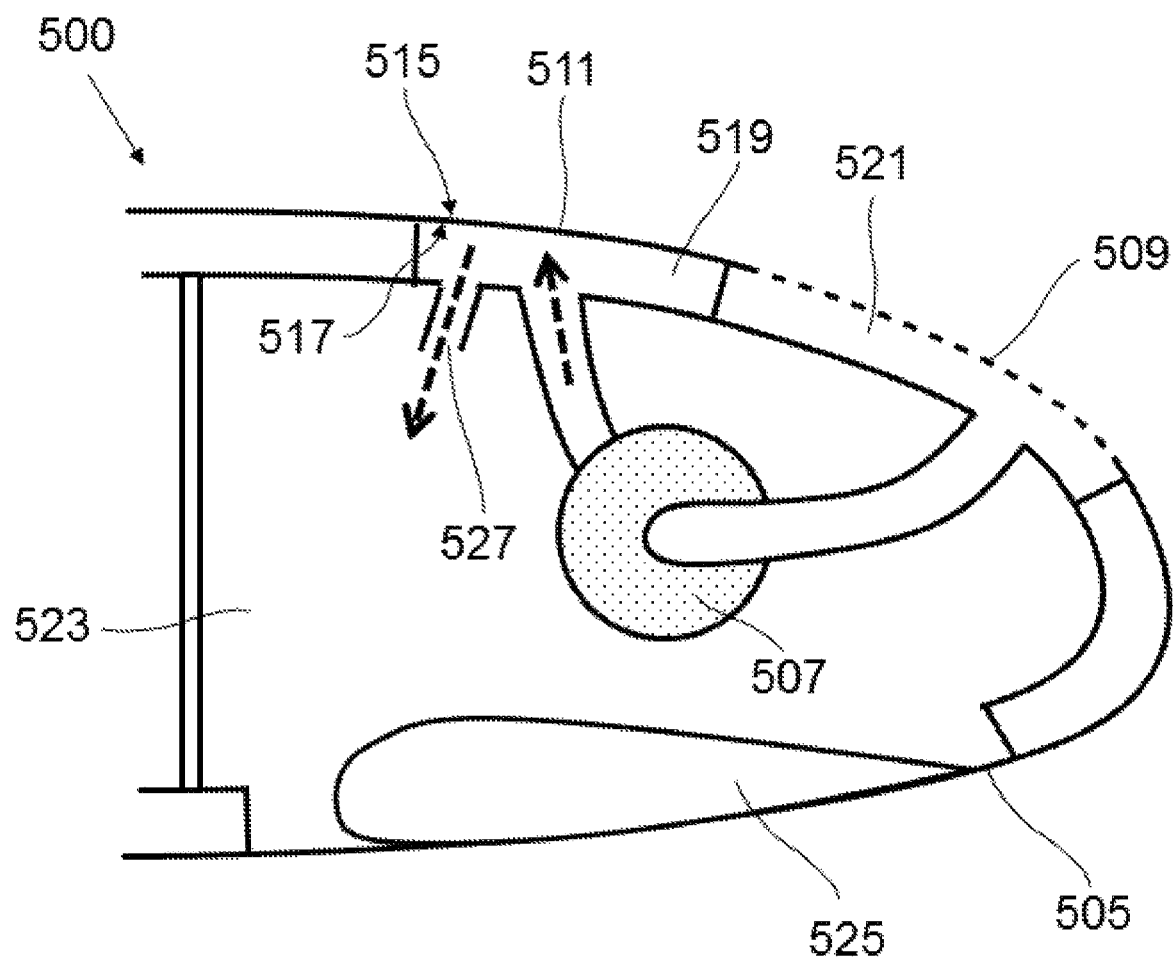
FIG. 5 shows a section view of a wing with a compressor heated leading edge according to a second embodiment of the invention.

FIG. 5 shows an aircraft structure according to a second embodiment of the invention. The aircraft structure in this exemplary embodiment is a wing. The aircraft 13340-US-NP structure 500 comprises an internal cavity 523, a Krueger flap 525, and a skin 505 with perforated 509 and non-perforated sections 511. The non-perforated section of the skin comprises an external surface 515 on its outer face, and an internal surface 517 on its inner face, opposite the external surface. When in flight, the external surface is exposed to outside airflow and so is susceptible to ice formation. The aircraft structure further comprises a plurality of chambers 519, 521 arranged adjacent to the skin, such that a first chamber 519 is formed on the internal surface of the non-perforated section of the skin, and a second chamber 521 is formed inside the aircraft structure on the perforated section of the skin. The perforated section of the skin, the second chamber, and a compressor 507 comprise a laminar flow control (LFC) system. The compressor intake is connected to the second chamber, and the compressor exhaust is connected to the first chamber. The first chamber further comprises an opening 527 from the first chamber into the internal cavity.

In operation, the compressor sucks air through the perforated section of the aircraft skin and through into the compressor. The compressor performs work on the air, which raises the temperature of the air. The hot compressor exhaust air is then directed into the first chamber, where it heats the internal surface of the aircraft skin before escaping through the opening of the first chamber into the internal cavity. The compressor exhaust air in the internal cavity, despite having lost heat to the internal surface whilst in the first chamber, is still hotter than ambient temperature so heats the internal cavity. This may advantageously prevent the Krueger flap from freezing in place. The compressor exhaust air in the internal cavity finally leaks through gaps in the skin, for example around the Krueger flap, to outside airflow.

Figure 6:
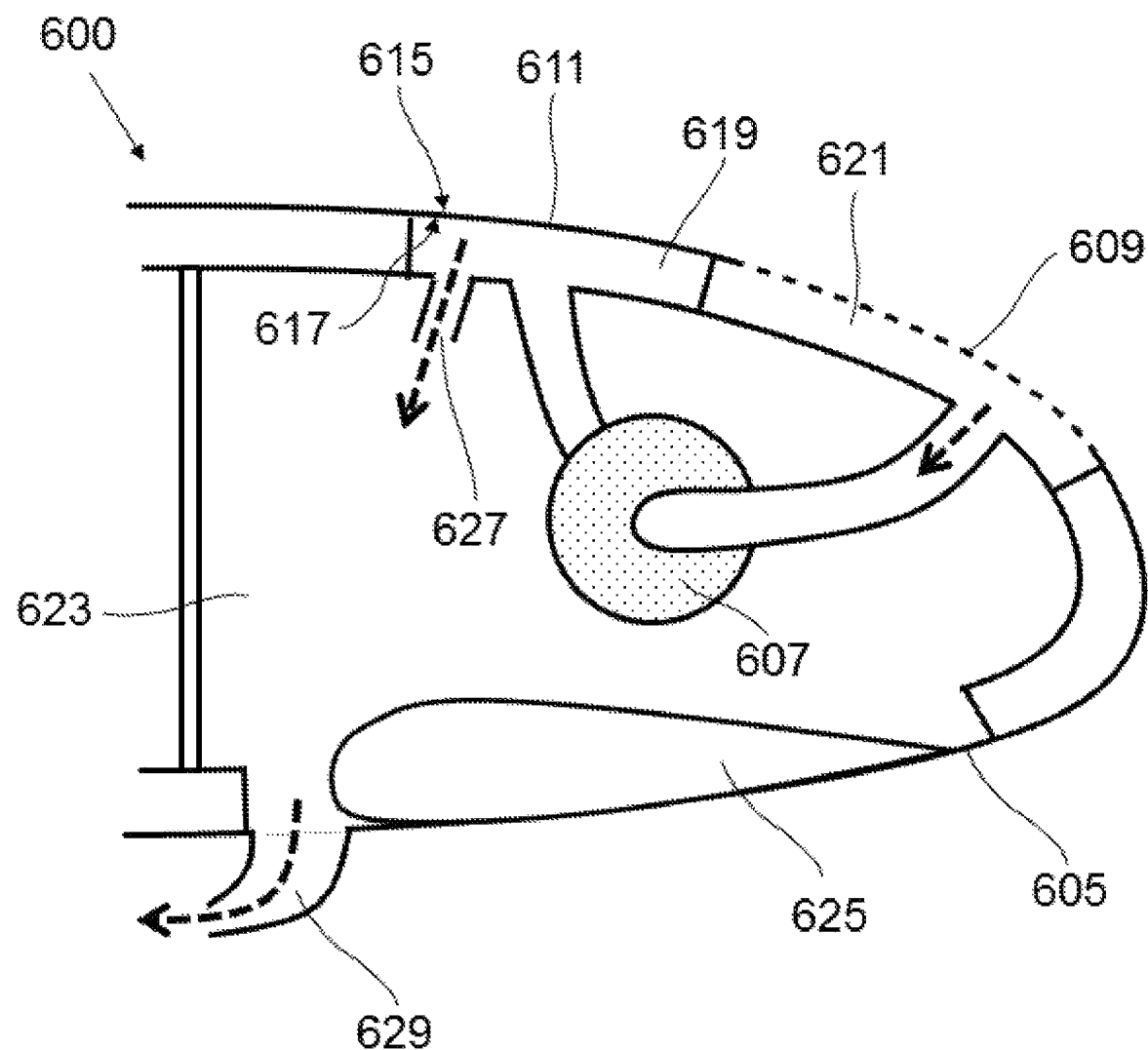
FIG. 6 shows a section view of a wing with a compressor heated leading edge according to a third embodiment of the invention.

FIG. 6 shows an aircraft structure according to a third embodiment of the invention. Once again the aircraft structure in this example is an aircraft wing. The aircraft structure 600 comprises an internal cavity 623, a Krueger flap 625, a vent 629 from the internal cavity to outside airflow, and a skin 605 with perforated 609 and non-perforated sections 611. The non-perforated section of the skin comprises an external surface 615 on its outer face, and an internal surface 617 on its inner face, opposite the external surface. When in flight, the external surface is exposed to outside airflow and so is susceptible to ice formation. The aircraft structure further comprises a plurality of chambers 619, 621 arranged adjacent to the skin, such that a first chamber 619 is formed on the internal surface of the non-perforated section of the skin, and a second chamber 621 is formed inside the aircraft structure on the perforated section of the skin. The perforated section of the skin, the second chamber, and a compressor 607 comprise a laminar flow control (LFC) system. The compressor intake is connected to the second chamber, and the compressor exhaust is connected to the first chamber. The first chamber further comprises an opening 627 from the first chamber into the internal cavity.

In operation, the compressor sucks air through the perforated section of the aircraft skin and through into the compressor. The compressor performs work on the air, which raises the temperature of the air. The hot compressor exhaust air is then directed into the first chamber, where it heats the internal surface of the aircraft skin before escaping through the opening of the first chamber into the internal cavity. The compressor exhaust air in the internal cavity, despite having lost heat to the internal surface whilst in the first chamber, is still hotter than ambient temperature so heats the internal cavity. Advantageously, this may prevent the Krueger flap from freezing in place. The compressor exhaust air in the internal cavity is finally exhausted from the aircraft structure to outside airflow through the vent 629. The vent 629 (shown schematically only in FIG. 6) is in the form of a thrust nozzle arranged to blow the air in a manner that assists with laminar flow attachment, thus providing a beneficial effect on aircraft aerodynamic performance. For example, the thrust nozzle may be arranged to blow air over the flaps on the trailing edge of the wing to increase lift at high angles of attack.

Figure 7:
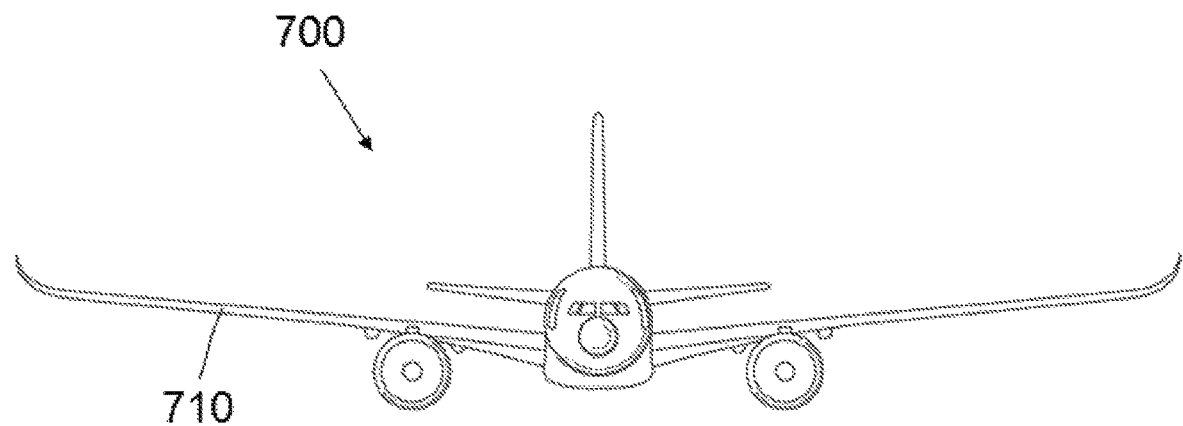
FIGS. 7 and 8 show an aircraft according to a fourth embodiment of the invention incorporating a compressor heated leading edge according to the first embodiment.
Figure 8:
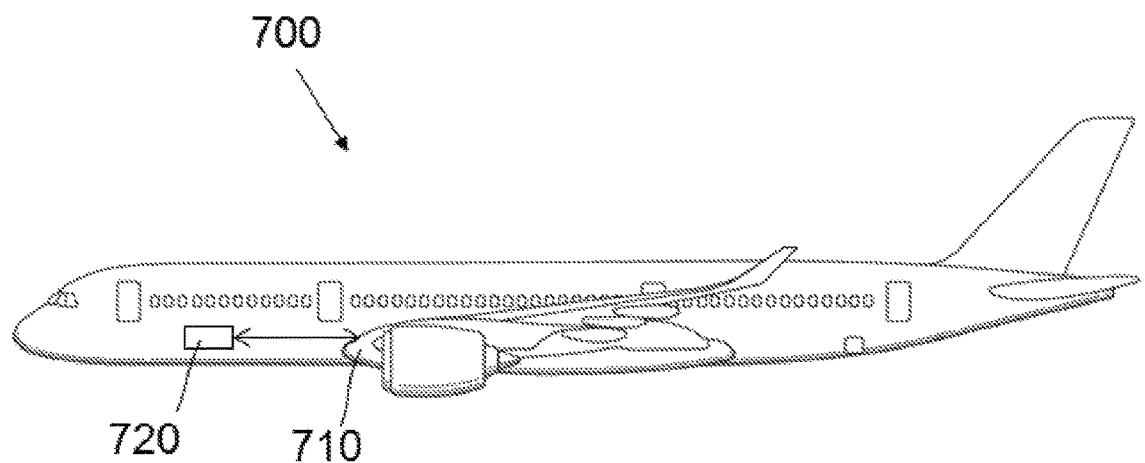

FIGS. 7 and 8 show an aircraft 700 according to a fourth embodiment of the invention incorporating a compressor heated leading edge of a type similar to the first embodiment (the differences now being described along with other details). A compressor (not shown separately in FIGS. 7 and 8), with variable vane geometry provides both heat to the leading edge of the wing 710 of the aircraft (for ice protection) and laminar flow control on the outer surface of the of the wing 710 of the aircraft for improved aerodynamic performance. A control unit 720 (shown schematically) is associated with the compressor. The control unit 720 functions to control the laminar flow over the wing by sucking air onto the wing 710. The control unit 720 functions to control—when so selected (i.e. on demand from the pilot)—to provide ice-protection by means of increasing the temperature of the exhaust air from the compressor as a result of varying the pressure ratio of the compressor (which is achieved by varying the vane geometry). The compressor used in this method has a motor power of 200 kW. In operation, this compressor may generate about 60 kW of heat. This heat may then be used to provide ice-protection.

Figure 9:
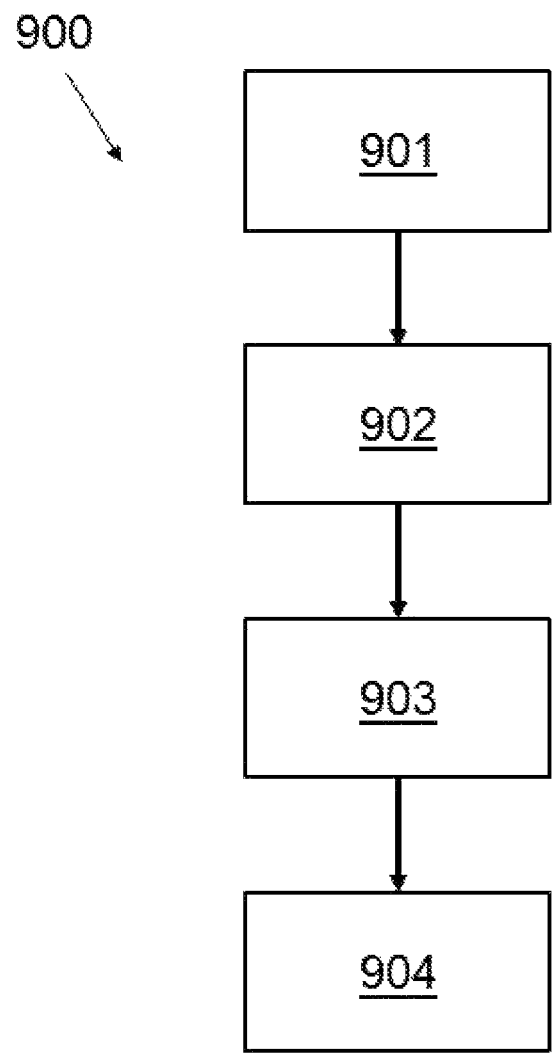
FIG. 9 shows a flow chart illustrating a method of using compressor exhaust air to provide ice protection according to a fifth embodiment of the invention.

FIG. 9 shows steps of a method 900 for providing ice protection on a surface of an aircraft using exhaust air from an LFC compressor in accordance with a fifth embodiment of the invention, comprising various steps. A first step, represented by box 901, of directing exhaust air from the LFC compressor onto an internal surface of the skin of the aircraft structure. An optional second step, represented by box 902, of circulating the compressor exhaust air into an internal cavity of the aircraft structure. A third step, represented by box 903, of exhausting the 'spent' compressor exhaust gas from the aircraft structure to outside airflow. An optional fourth step, represented by box 904, of controlling the geometry of the compressor to provide control of the compressor pressure ratio and thereby its running efficiency. It will be appreciated that the steps may be performed concurrently and/or in a different order from that shown in FIG. 9.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

Although embodiments of the invention have been described in which the compressor exhaust air is directed onto the internal surface of the aircraft skin by use of one or more chambers, it will be appreciated by one of ordinary skill in the art that other structures may be used which achieve the same effect. For example, a piccolo tube with perforations positioned to direct exhaust air onto the internal surface of the aircraft skin may be used. Alternatively, compressor exhaust air may be directed through a finned pipe, wherein the fins are arranged to transfer heat from the pipe to an aircraft skin.

Although preceding embodiments show the present invention implemented in an aircraft wing, it will be appreciated by one of ordinary skill in the art that the present invention is equally applicable to other parts of an aircraft. For example, the present invention may be incorporated into any or all of a fin, tailplane, nacelle, section of an aircraft belly, and wingtip device.

In other embodiments of the invention, there may further be provided a dedicated control system for controlling the operation of the LFC compressor. The control system may control any or all of the temperature of the compressor exhaust air, the flow rate of the compressor, and/or where in the aircraft structure exhaust air is directed to. The control system may form part of a larger system for controlling other aspects of the aircraft's operation. The control system may for example be provided by a central control computer of the aircraft.

The air that is used for de-icing/anti-icing may be heated to above 50 degrees C. and possibly high enough that water/moisture is caused to evaporate from the aircraft structure.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise.

This disclosure hereby incorporates by reference the complete disclosure of any patent or application from which it claims benefit or priority.

The invention is:

1. An aircraft structure comprising:
a skin including a perforated skin section;
an external surface on an outer face of the skin;
an internal surface of the skin opposite the external surface;
a chamber internal to the skin and including a wall formed by the internal surface; and
a laminar flow control system comprising a compressor, wherein the compressor is configured to suck air through the perforated skin section and discharge exhaust air which includes the air sucked in through the perforated skin section;
wherein the aircraft structure is so arranged that the exhaust air from the compressor is directed into the chamber and onto the internal surface to heat the skin.

2. The aircraft structure of claim 1, wherein the external surface is in a region of the aircraft structure which faces airflow over the aircraft structure during flight of the aircraft structure.

3. The aircraft structure of claim 1, wherein the aircraft structure is a wing.

4. The aircraft structure of claim 1, wherein the chamber is included in a plurality of chambers, arranged adjacent to the skin of the aircraft structure, wherein at least one chamber of the plurality of chambers is connected to a compressor intake of the compressor and another at least one chamber of the plurality of chambers is connected to a compressor exhaust of the compressor.

5. The aircraft structure of claim 1, wherein the aircraft structure is so arranged that the exhaust air, once directed onto the internal surface, is then directed into an internal cavity of the aircraft structure.

6. The aircraft structure of claim 1, further comprising one or more compressor exhaust vents extending from the aircraft structure and configured to discharge the exhaust air from the aircraft structure.

7. The aircraft structure of claim 6, wherein the one or more compressor exhaust gas vents comprise nozzles arranged to blow the exhaust air over an airfoil surface.

8. The aircraft structure of claim 1, further comprising a control system for controlling characteristics of the exhaust air from the compressor.

9. The aircraft structure of claim 8, wherein the compressor is a variable geometry compressor and the control system is arranged to vary a pressure ratio of the variable geometry compressor to provide control over a temperature of the exhaust air.

10. The aircraft structure of claim 1, wherein the chamber is one of further comprising a plurality of chambers arranged adjacent to the skin of the aircraft structure, wherein:
at least one chamber of the plurality of chambers is connected to an intake of the compressor and at least one other chamber of the plurality of chambers is connected to an exhaust of the compressor;
the aircraft structure is a wing; and
the external surface is on a leading edge of the wing.

11. The aircraft structure of claim 1, further comprising:
an duct including an inlet connected to an exhaust outlet of the compressor and an outlet; and
wherein the wall of the chamber is formed by an unperforated region of the skin,
wherein the outlet to the duct is connected to the chamber, and wherein the exhaust air from the compressor flows through the duct and into the first chamber to heat the unperforated region of the skin.

12. An ice protection system for use on an aircraft comprising:
    a pump arranged to suck air through perforated cladding forming part of the skin of the aircraft,
    wherein the pump is arranged to guide exhaust gas from the pump to a chamber within the skin and against an inside surface of the skin to heat the skin, and
    wherein the chamber includes a wall formed by the inside surface, and
    wherein the exhaust air includes air sucked through the perforated cladding.

13. An aircraft comprising an aircraft structure according to claim 1.

14. An aerodynamic control or lifting structure of an aircraft comprising:
    a skin including a perforated region and an unperforated region, and
    a laminar flow control system comprising a compressor, the perforated region, an inlet duct providing fluid communication between the perforated region and an inlet to the compressor, and an outlet duct providing fluid communication between an outlet of the compressor and a first chamber within the skin and having a wall formed by an inner surface of the unperforated region;
    wherein the laminar flow control system is configured for the compressor to draw air flowing over the skin through the perforated region and into the inlet duct, and simultaneously exhaust the air through the outlet duct and to the first chamber and to the inner surface of the unperforated region.

15. The aircraft structure of claim 2, wherein the inner surface of the skin forms is in a leading edge of the aerodynamic control or lifting structure.

16. The aircraft structure of claim 14, further comprising a second chamber adjacent the perforated region and connected to the inlet duct.

* * * * *